Jan. 22, 1929.      A. T. POTTER      1,699,750
WINDSHIELD OPERATOR
Filed March 9, 1927      2 Sheets-Sheet 1
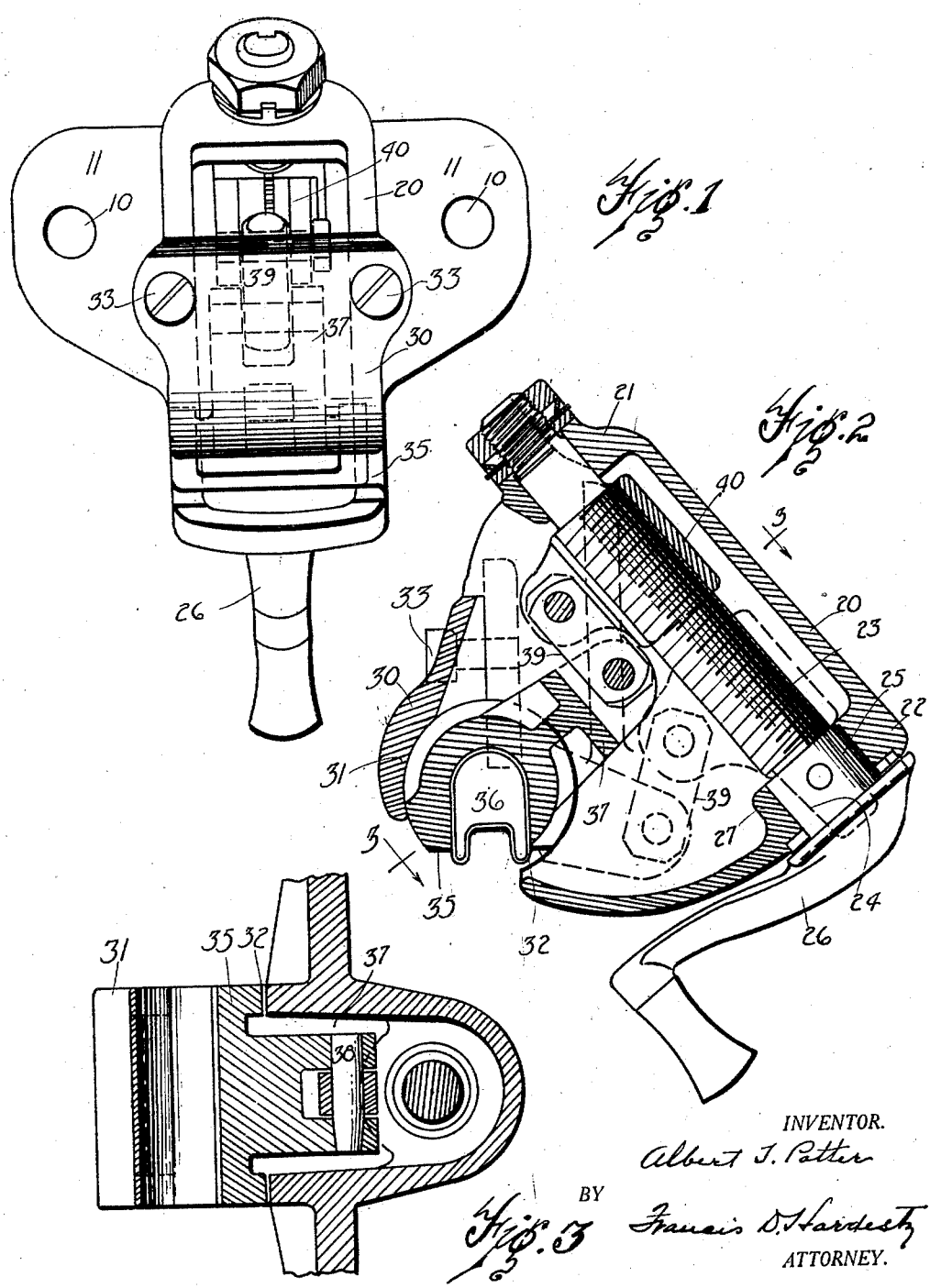
INVENTOR.
Albert T. Potter
BY Francis D. Hardesty
ATTORNEY.

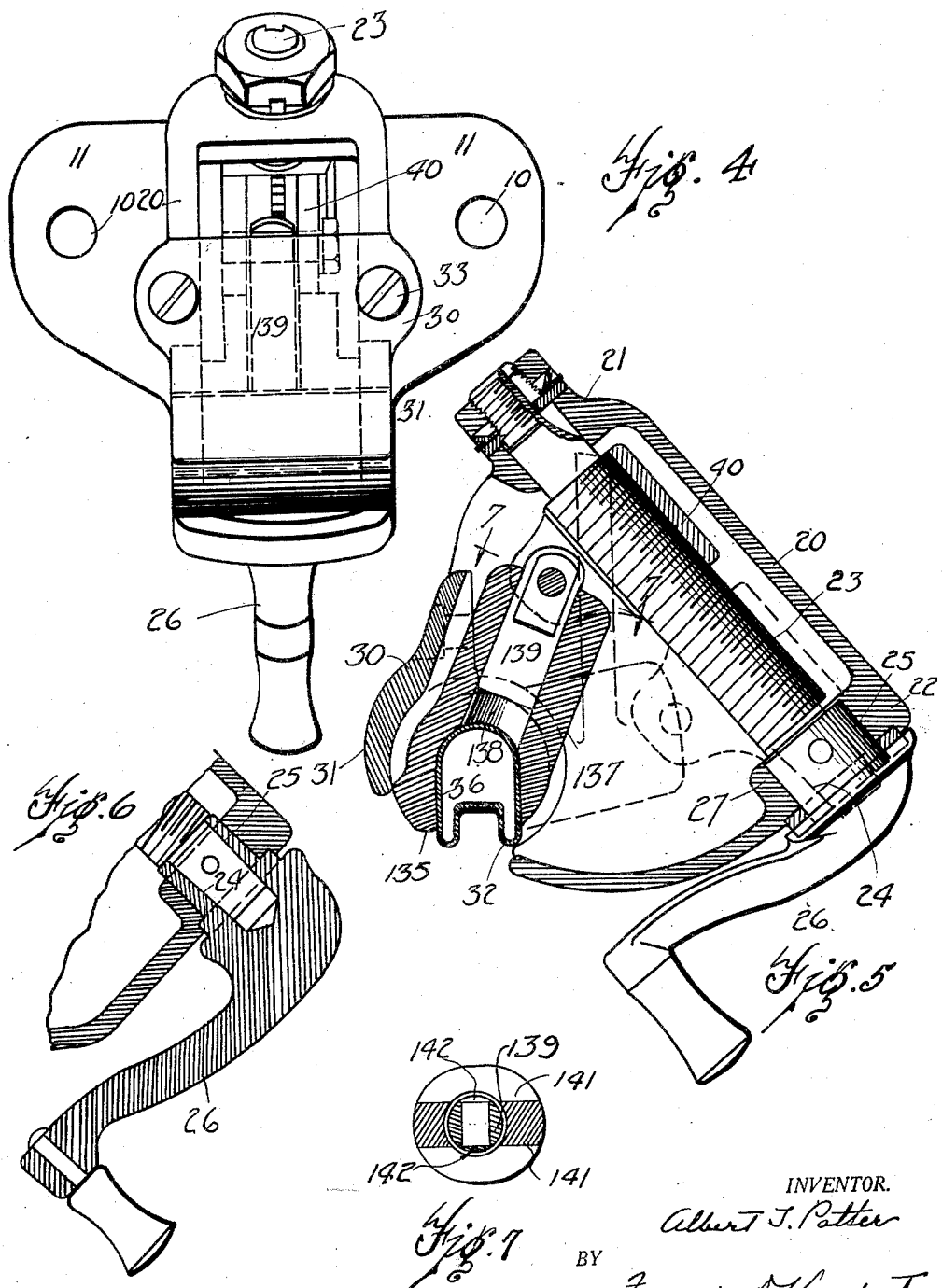

Patented Jan. 22, 1929.

1,699,750

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD OPERATOR.

Application filed March 9, 1927. Serial No. 173,824.

The present invention relates to operating devices for closures particularly adapted to operate windshields for closed automobiles.

Among the objects of the invention is a device of the kind described which shall be simple, compact, efficient and of good appearance.

Another object is a device which shall be more durable and capable of finer adjustment than devices of this type heretofore produced.

Still other objects will readily appear to those skilled in the art upon reference to the following description and accompanying drawings in which:—

Fig. 1 is a front elevation of an operating device embodying the invention;

Fig. 2 is a vertical section therethrough;

Fig. 3 is a section on line 3—3 of Fig. 2;

Fig. 4 is a view similar to Fig. 1 of a modified form;

Fig. 5 is a vertical section of the device of Fig. 4;

Fig. 6 is a section through the operating handle showing its attachment;

Fig. 7 is a section on line 7—7 of Fig. 5.

Like parts are designated by like numbers throughout the several views of the drawings.

The device shown is intended to be attached to the depending part of an automobile top directly over the windshield by means of bolts or screws extending through the holes 10 in the side flanges 11. It will be so positioned that the upper framing tube of the windshield portion may be secured to the proper part of the device and operated thereby to swing to any desired adjusted position.

The device comprises a casing 20, roughly triangular in side elevation with one apex at the top. Mounted within the casing 20 and provided with bearings at the upper corner 21 and at one of the lower corners 22 is a threaded shaft 23. It is preferred to have the shaft tapered at its lower end 24 and secured in a cylindrical shank 25 forming a part of an operating crank handle 26. The shank extends into the bearing boss 27 in the lower corner 22 of the casing and forms one of the members of the bearing for this end of the shaft. The other end of the shaft may have its bearing directly in the casing.

The side of the casing 20 opposite shaft 23 is open and faced to receive a plate 30. This plate is formed with its lower portion 31 curved to form a part of a bearing for the windshield member 35, the other part of the bearing being formed by an arcuate cut 32 in the two walls of casing 20. Plate 30 may be secured in place by screws 33.

Mounted in the bearing formed by plate 30 and the cut out walls of casing 20 is the windshield member 35. This consists of a substantially cylindrical portion, cut out axially to receive tightly the windshield tube 36, and provided with an arm 37 extending into casing 20 to near shaft 23. This arm is divided at its outer end and drilled to receive a pin 38 upon which is swingably mounted a link 39.

Link 39 connects arm 37 with a nut 40 to which it is secured in the same fashion as to arm 37. This nut 40 is threaded upon shaft 23 so that when the latter is revolved by means of handle 26, the member 35 will be rotated in its bearing and correspondingly swing the windshield carried in tube 36.

The link connection between nut 40 and arm 37 of course permits the end of the arm to swing in the casing toward and from the shaft.

In the form of device shown in Figs. 4, 5 and 7, the windshield member is similar to that just described excepting that arm 137 is drilled axially as at 138 and instead of a link connection, a plunger 139 is fitted in this hole. This plunger 139 is hinged to nut 40 and by moving in and out of the hole permits the arm 137 to swing toward and away from shaft 23.

In order that the several parts common to the two forms may be interchangeable arm 137 is cut away on both sides as at 141 to permit it to slide between the lugs on nut 40. Plunger 139 may also be narrowed as shown at 142.

Having now described the invention and the preferred forms of embodiment thereof it is to be understood that the invention is to be limited not to the specific details of construction herein set forth and illustrated but only by the scope of the claims which follow.

I claim:—

1. Means for swinging to adjusted position the windshield of a vehicle comprising a casing adapted to be secured to a stationary portion of the vehicle and extending over and embracing the upper edge of the windshield, a longitudinally fixed rotatable threaded shaft in said casing means for rotating same, a rotatable member adapted to be secured to said windshield and having a bearing in said casing, an arm on said member, a travelling nut on said shaft and means flexibly connecting said arm and nut whereby the end of said arm may be moved in an arc by said nut.

2. Means for swinging to adjusted position the windshield of a vehicle comprising a casing adapted to be secured to a stationary portion of the vehicle and extending over and embracing the upper edge of the windshield, a longitudinally fixed rotatable threaded shaft in said casing means for rotating same, a rotatable member adapted to be secured to said windshield and having a bearing in said casing, an arm on said member, a travelling nut on said shaft and means sildably connecting said arm and nut whereby the end of said arm may be moved in an arc by said nut.

ALBERT T. POTTER.